United States Patent
Zampell et al.

(10) Patent No.: US 11,852,338 B2
(45) Date of Patent: Dec. 26, 2023

(54) TILE ASSEMBLY FOR A WATERWALL PANEL

(71) Applicant: Zampell Refractories, Inc., Newburyport, MA (US)

(72) Inventors: Brian J. Zampell, Newburyport, MA (US); Lee Rollins, Jr., Wells, ME (US)

(73) Assignee: ZAMPELL REFRACTORIES, INC., Newburyport, MA (US)

( * ) Notice: Subject to any disclaimer, the term of this patent is extended or adjusted under 35 U.S.C. 154(b) by 139 days.

(21) Appl. No.: 17/313,377

(22) Filed: May 6, 2021

(65) Prior Publication Data

US 2021/0348758 A1    Nov. 11, 2021

Related U.S. Application Data

(60) Provisional application No. 63/021,302, filed on May 7, 2020.

(51) Int. Cl.
| | |
|---|---|
| *F23M 5/02* | (2006.01) |
| *F27D 1/12* | (2006.01) |
| *F22B 37/10* | (2006.01) |
| *F27D 9/00* | (2006.01) |

(52) U.S. Cl.
CPC ............. *F23M 5/02* (2013.01); *F22B 37/108* (2013.01); *F27D 1/12* (2013.01); *F27D 2009/0032* (2013.01)

(58) Field of Classification Search
CPC ..................................................... F22B 37/108
USPC ......................................................... 122/494
See application file for complete search history.

(56) References Cited

U.S. PATENT DOCUMENTS

| | | | | |
|---|---|---|---|---|
| 4,934,322 A | * | 6/1990 | Fournier ................... | F23M 5/08 122/DIG. 13 |
| 5,083,424 A | * | 1/1992 | Becker ..................... | F23R 3/007 60/796 |
| 5,243,801 A | * | 9/1993 | Aiken ....................... | F23M 5/02 122/6 A |
| 5,542,378 A | * | 8/1996 | Kubiak ................. | F22B 37/108 165/162 |
| 5,673,527 A | * | 10/1997 | Coston ...................... | F27D 1/12 52/513 |

(Continued)

*Primary Examiner* — Steven B McAllister
*Assistant Examiner* — John E Bargero
(74) *Attorney, Agent, or Firm* — KRIEGSMAN & KRIEGSMAN

(57) ABSTRACT

An array of tile assemblies is fixedly connected to a common waterwall panel to form a refractory liner for an incinerator. Each tile assembly includes a unitary, clip-type, metallic anchor, which is directly welded to the waterwall panel, and a solid refractory tile slidably connected to the anchor through a dovetail locking mechanism. The rear surface of the refractory tile includes a longitudinal rib from which projects a dovetail pin configured to receive the anchor. The longitudinal rib increases the overall thickness of the refractory tile through the region of interconnection with the anchor. In this manner, the anchor is suitably protected by the refractory tile from intense heat which may otherwise cause mechanical failure in the locking mechanism. Additionally, the solid construction of refractory tile both limits the presence of air gaps within the tile assembly and reduces the likelihood of tile fragmentation or cracking.

7 Claims, 8 Drawing Sheets

(56) References Cited

U.S. PATENT DOCUMENTS

| | | | | |
|---|---|---|---|---|
| 5,845,610 | A | * | 12/1998 | Hatta ................. F23M 5/02 |
| | | | | 122/DIG. 13 |
| 6,012,401 | A | * | 1/2000 | Orita ................ F22B 37/107 |
| | | | | 110/325 |
| 6,267,066 | B1 | * | 7/2001 | Schickling ............. F23M 5/02 |
| | | | | 110/325 |
| 10,495,304 | B2 | * | 12/2019 | Boer ................. F27D 1/0006 |
| 2006/0101740 | A1 | | 5/2006 | Heffernan et al. |
| 2011/0146596 | A1 | | 6/2011 | Kern et al. |

\* cited by examiner

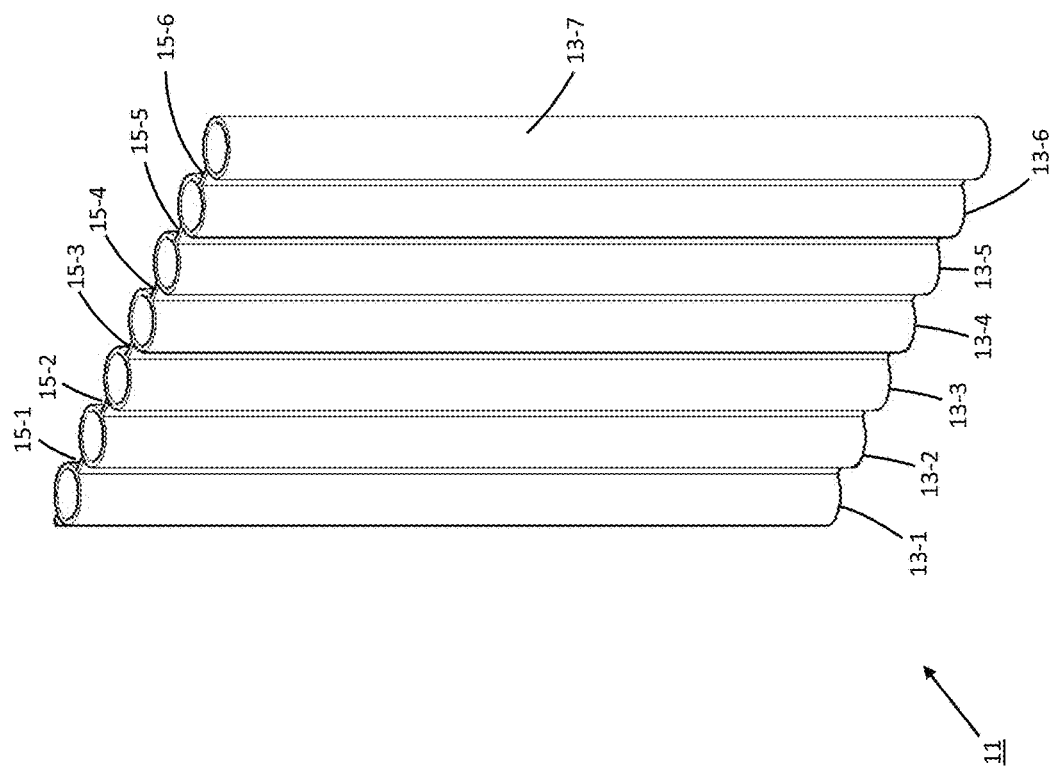

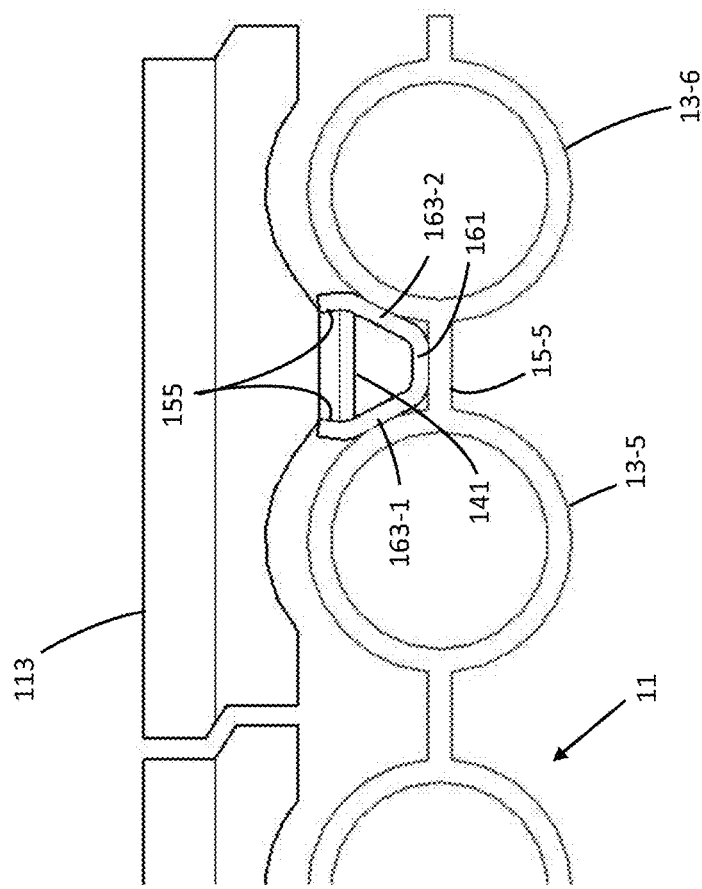
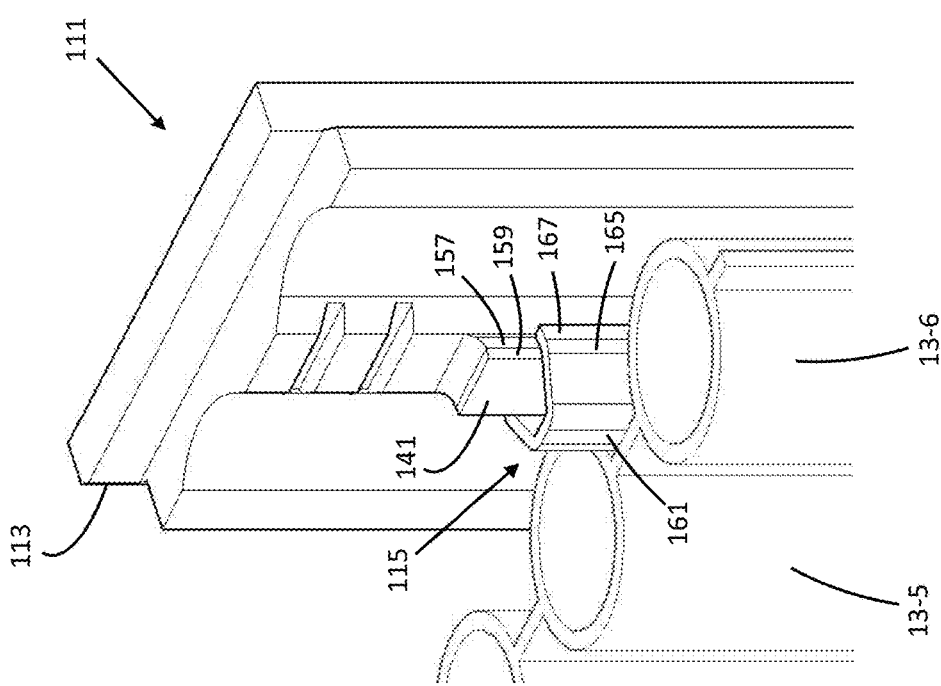
Fig. 4(b)
Fig. 4(a)

TILE ASSEMBLY FOR A WATERWALL PANEL

CROSS-REFERENCE TO RELATED APPLICATIONS

The present application claims the benefit under 35 U.S.C. 119(e) to U.S. Provisional Patent Application No. 63/021,302, which was filed on May 7, 2020 in the names of Brian J. Zampell and Lee Rollins, Jr., the disclosure of which is incorporated herein by reference.

FIELD OF THE INVENTION

The present invention relates generally to waste disposal and, more particularly, to refractory liners for incinerators used in the combustion of waste products.

BACKGROUND OF THE INVENTION

An incinerator, or furnace, is commonly used to combust waste products through the application of intense heat, typically in excess of 1000° C. Energy-from-Waste (EfW) facilities are designed to utilize the heat generated through the incineration of municipal solid waste, or MSW, to produce usable energy.

For instance, heat produced from incinerators at EfW facilities is commonly applied to water to produce steam, which is subsequently used for, inter alia, district heating, hot water generation, and the production of electricity by turbine generator. A waterwall panel is an energy-transfer apparatus that is commonly incorporated into the interior walls of an incinerator in order to produce steam from the intense heat generated through the combustion of municipal solid waste.

One well-known version of a waterwall panel is shown in FIG. 1, the waterwall panel being identified generally by reference numeral 11. As can be seen, waterwall panel 11 comprises a plurality of cylindrical waterwall tubes 13-1 thru 13-7 that are arranged in parallel, each tube 13 being in fluid communication with a supply of water or other similar liquid. A plurality of flat panel membranes, or webbings, 15-1 thru 15-6 lie in a common plane and connect adjacent tubes 13 at their approximate centerline to form a unitary construction. Waterwall tubes 13 are preferably constructed of a thermally conductive material, such as carbon steel, in order to transfer heat generated through incineration to the supply of water retained therein.

Due to the intense heat generated within the region of combustion, it is required that the interior lining of an incinerator be constructed of a suitable heat-resistant material. One type of lining which is known in the art is formed by securing a plurality refractory tiles directly onto waterwall panels located within the furnace walls. Each refractory tile is preferably constructed of a thermally conductive material, such as nitride-bonded silicon carbide (SiC), which is able to not only withstand extreme heat and other corrosive and erosive products of incineration but also effectuate the efficient transfer of heat to the waterwall panel. In this capacity, the intense heat produced within the furnace is utilized to generate steam in the most energy-efficient fashion.

A metal anchor is commonly utilized to directly secure a refractory tile to a waterwall panel in order to create an incinerator liner. The metal anchor is typically welded to a membrane of the waterwall panel and, in turn, secured to the refractory tile, for example, using a complementary fastening element. Additionally, a silicon carbide mortar or castable is poured between the waterwall panel and refractory tile to further secure the connection of components.

Nonetheless, many conventional incinerator liners have been found to experience mechanical failure due to the continuous exposure to intense heat as well as the corrosive and erosive mixture of flue gas and ash generated through the incineration process.

One common cause of mechanical failure is due to the limited strength of the weld between the metal anchor and the waterwall panel. More specifically, the metal anchor and waterwall panel are typically constructed of dissimilar metals, which prevents the weld to adequately penetrate both materials, thereby compromising the quality of the bond. As a result, flexion in the waterwall panel can create a fracture between the anchor and the membrane, which is the thinnest and weakest portion of a waterwall panel.

Another common cause of mechanical failure is through degradation of the metal anchor. Specifically, the metal anchor is often insufficiently protected from both the intense heat as well as the corrosive and erosive mixture of flue gas and ash generated through the incineration process. Insufficient protection of the anchor is often the result of gaps that form between adjacent refractor tiles due to routine exposure to intense heat as well as the presence of anchor-receiving cavities or bores integrally formed in the refractory tile. The cumulative effect of these elements has been found to degrade the metallurgy of the anchor, resulting in a weakening of its retentive strength.

Another common cause of mechanical failure is through the tile itself. As can be appreciated, a refractory tile is typically constructed as thin as possible in order to maximize heat transfer between the furnace and the waterwall panel as well as enable the waterwall panel to suitably cool the interior surface of the refractory tile, which may become covered with combustion ash that may otherwise penetrate the tile. However, it should be noted that the reduced thickness of the tile renders it more susceptible to cracking or fragmentation, particularly through the region of connection with the metal anchor.

To remedy some of the aforementioned causes of mechanical failure, various techniques have been utilized in the art to ensure the strength and reliability of the connective forces maintained between a refractory tile and a waterwall panel.

As a first technique, the enlarged head of a bolt-type metal anchor is welded to a membrane of the waterwall panel. The tile is then mounted onto the waterwall panel such that the bolt stem penetrates through a transverse bore formed in the tile, with the distal end of the bolt stem being threaded to receive a complementary nut and washer. Through tightening of the nut onto the bolt, the tile is fixedly secured onto the waterwall panel. However, it should be noted that the aforementioned construction results in the nut, as well as a portion of the bolt, being in front of the tile within the region of combustion. Because these metal fastening elements are unable to withstand intense heat and corrosive effects for prolonged periods of time, mechanical failure of the fastening elements commonly occurs.

As a second technique, a similar pair of fastening elements (namely, a metallic bolt and a nut) is utilized to secure a tile onto a waterwall panel. However, a T-nut is utilized and is disposed within a slot in the back surface of the tile. In one version of this design, the T-nut is constructed of a ceramic material in order to protect the metallic bolt from the extreme conditions produced within the region of combustion. Rotation of the T-nut on the threaded bolt is achieved using a tool which is inserted through a small bore formed in the front of the tile. An example of the aforementioned tile construction is illustrated in U.S. Pat. No. 5,673,527 to K. R. Coston et al., the disclosure of which is incorporated herein by reference.

It has been found that, with refractory tiles constructed in the manner as set forth above, it is often difficult to patch with mortar any remaining gaps or spacing present in the nut-receiving slot in the back surface of the tile. As a result, air pockets in the rear surface of the tile are created. As can be appreciated, air pockets present in the tile act as thermal insulators that prohibit adequate transfer of heat away from the interior facing of the tile. Consequently, the interior surface of the tile is subject to potential overheating, which in turn can produce cracking or other fragmentation in the tile.

As a third technique, the design set forth in the '527 patent is modified by using a self-flowing castable material to fill in any resultant gaps or spacing in the nut-receiving slot in the back surface of the tile. However, although the presence of air gaps can be effectively minimized using this technique, it has nonetheless been found that the inclusion of the nut-receiving slot significantly reduces the thickness of the tile through its primary region of connection. Due to thermal expansion and mechanical stress imparted onto the tile through this relatively thin region of connection, cracking of the tile through this region has been found to occur over time.

As a fourth technique, a rear ventilation system is incorporated into the tile design within the upper regions of a refractory liner. An example of such a system is shown in U.S. Patent Application Publication No. 2011/0146596 to A. Kern, et al., the disclosure of which is incorporated herein by reference. As part of this design, a large plenum is utilized to blow air through holes in the waterwall panel membrane and onto the rear of the refractory tiles at a pressure which is greater than the air pressure within the interior of the incinerator. As a result, flue gases and other harmful particulates are unable to penetrate into voids within the tile. However, it has been found that the aforementioned technique not only increases manufacturing complexity and related costs but also experiences multiple points of failure due to, inter alia, intermittent loss of air pressure from the plenum, particulate blockages within the membrane holes, and rapid expansion within the system introduced during transition between the different states of incinerator operation.

SUMMARY OF THE INVENTION

In view thereof, it is an object of the present invention to provide a novel tile assembly used to form the refractory liner for an incinerator.

It is another object of the present invention to provide a tile assembly as described above which is adapted to be directly connected to a waterwall panel.

It is yet another object of the present invention to provide a tile assembly as described above which efficiently transfers heat produced by the incinerator to waterwall panel.

It is still another object of the present invention to provide a tile assembly that is specifically designed to minimize the risk of both material degradation and mechanical failure.

It is yet still another object of the present invention to provide a tile assembly of the type as described above which has a limited number of parts, is inexpensive to manufacture, and is easy to install.

Accordingly, as one feature of the present invention, there is provided a tile assembly adapted for connection to a waterwall panel, the tile assembly comprising (a) a refractory tile, the refractory tile comprising an enlarged, planar front surface and an exposed, non-planar rear surface, and (b) a metallic anchor, the metallic anchor comprising a center member from which protrudes a pair of opposing side members, (c) wherein the metallic anchor is connected to the non-planar rear surface of the refractory tile, the metallic anchor and the refractory tile together forming a dovetail joint.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts:

FIG. 1 is a front perspective view of a waterwall panel which is well known in the art;

FIGS. 4(a) and 4(b) are rear perspective and top views, respectively, of the tile assembly shown in FIG. 3(a), the tile assembly being shown on a waterwall panel, the waterwall panel being shown in lateral cross-section to better illustrate the connection details;

DETAILED DESCRIPTION OF THE INVENTION

Tile Assembly 111

Figure 2B:
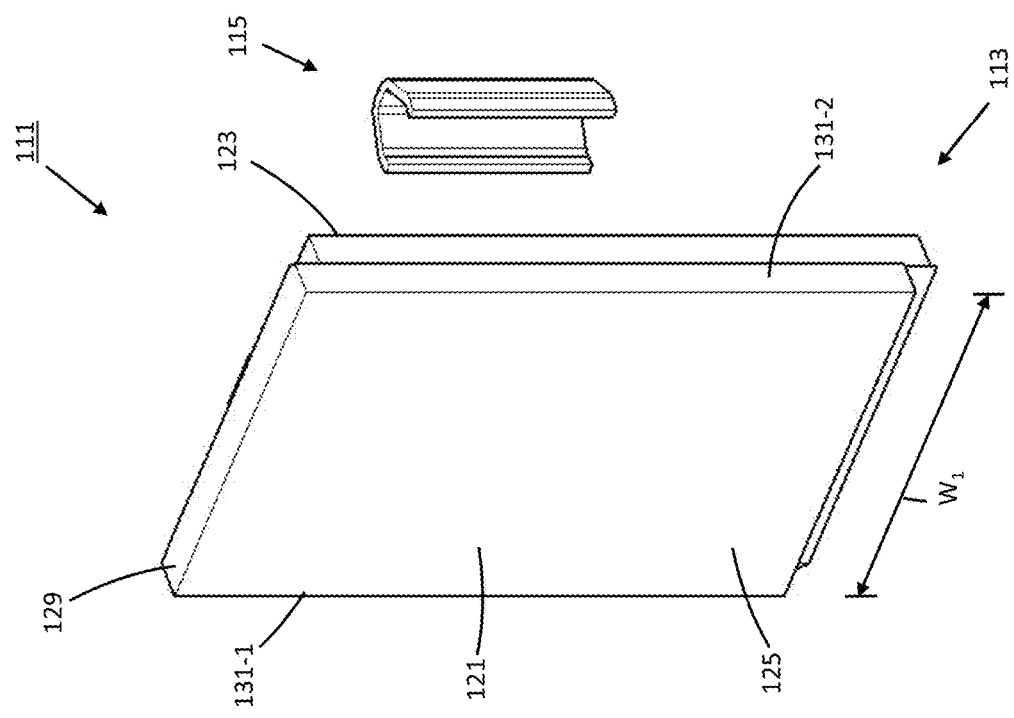
FIGS. 2(a) and 2(b) are exploded rear perspective and front perspective views, respectively, of a tile assembly constructed according to the teachings of the present invention, the tile assembly being particularly well suited for installation on the waterwall panel shown in FIG. 1.
Figure 2A:
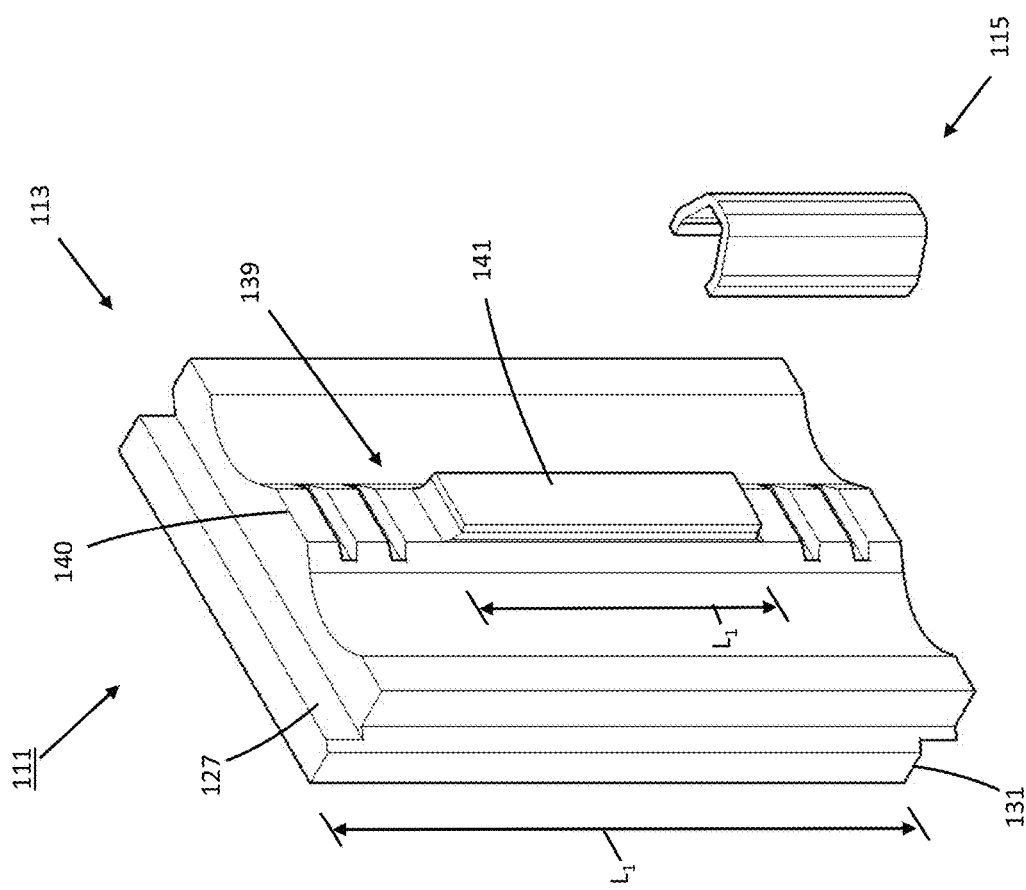

Referring now to FIGS. 2(a) and 2(b), there are shown exploded rear perspective and front perspective views, respectively, of a tile assembly constructed according to the teachings of the present invention, the tile assembly being identified generally by reference numeral 111. As will be explained further in detail below, tile assembly 111 is designed to be connected to a waterwall panel in order to create a uniform, thermally conductive, refractory liner for a furnace used in an Energy-from-Waste (EfW) facility. Due to its unique construction, tile assembly 111 experiences minimal material degradation, thereby ensuring a durable and reliable means of connection with a waterwall panel.

In the description that follows, tile assembly 111 is referenced as being designed primarily for use with a waterwall panel in order to form an interior liner for a furnace in an EfW facility. However, it should be noted that the present invention is not limited to connection to waterwall panels in furnaces used in the disposal of waste. Rather, it is to be understood that the principles of the present invention could be similarly applied to additional applications which require the construction of a highly conductive refractory liner which is able to withstand extreme heat and corrosive effects without compromising its structural integrity.

As can be seen, tile assembly 111 comprises (i) a one-piece refractory tile 113, and (ii) a metallic anchor 115 that enables refractor tile 113 to be mounted onto a waterwall panel in a secure and reliable fashion. As will be explained further below, metallic anchor 115 is designed to be well protected by refractory tile 113 when tile assembly 111 is installed on a waterwall panel. As a result, tile assembly 111 experiences minimal risk of connective failure over time, which is a principal object of the present invention.

Tile 113 is preferably formed as a unitary member constructed of a material that is both highly conductive and resistant to decomposition by heat, pressure or chemical attack, such as a nitride-bonded silicon carbide (SiC). In this manner, tile 113 is capable of efficiently transferring heat produced within the interior of a furnace to a waterwall panel, while maintaining an optimal degree of strength and structural integrity. It should also be noted that the solid construction of tile 113 (i.e., in the absence of holes, pockets or cavities used to receive a coupling fastener) eliminates the presence of air pockets or other areas of weakness which may accumulate contaminants and/or fragment over time.

Refractory tile 113 comprises (i) a generally rectangular, planar slab, or facing, 121, and (ii) a mounting block, or base, 123 integrally formed on facing 121 in an offset relationship relative thereto. The slightly offset relationship between facing 121 and base 123 facilitates installation of multiple adjoining tiles 113 onto a common waterwall panel, as will be explained further below.

Rectangular slab 121 comprises an enlarged, flat, front, or interior, surface 125, a rear surface 127, a top edge 129, a bottom edge 131, and opposing side edges 133-1 and 133-2. Dimensionally, rectangular slab 121 has a length $L_1$ of approximately 12.0 inches and a width $W_1$ of approximately 7.75 inches. As can be appreciated, the enlarged, planar, rectangular shape of front surface 125 renders it particularly well suited in forming a wall-like refractory liner.

Figure 3B:
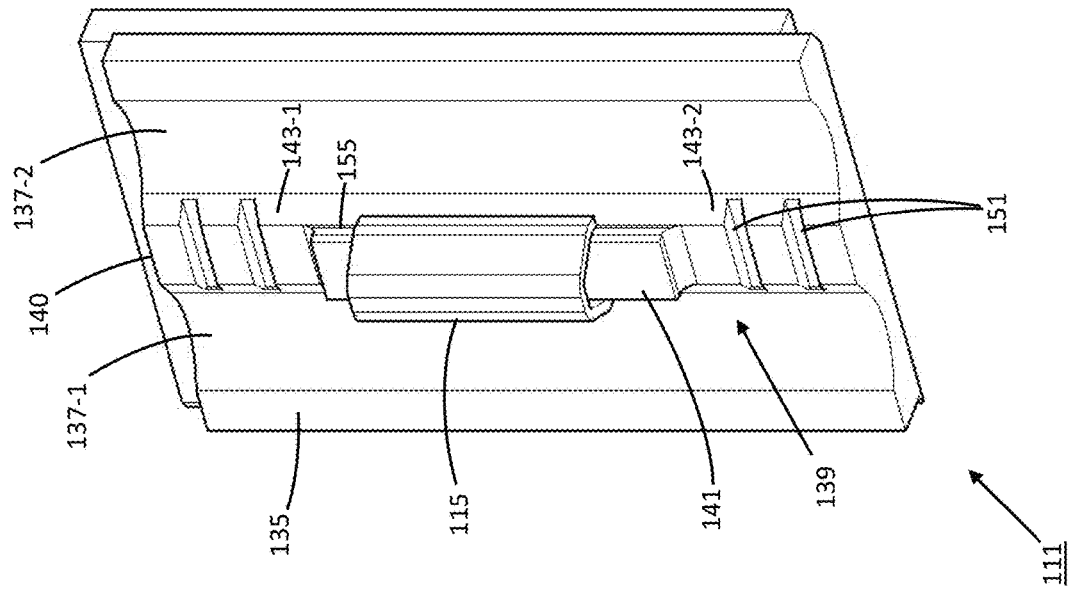
FIGS. 3(a) and 3(b) are assembled rear top perspective and rear bottom perspective views, respectively, of the tile assembly shown in FIG. 2(a)
Figure 3A:
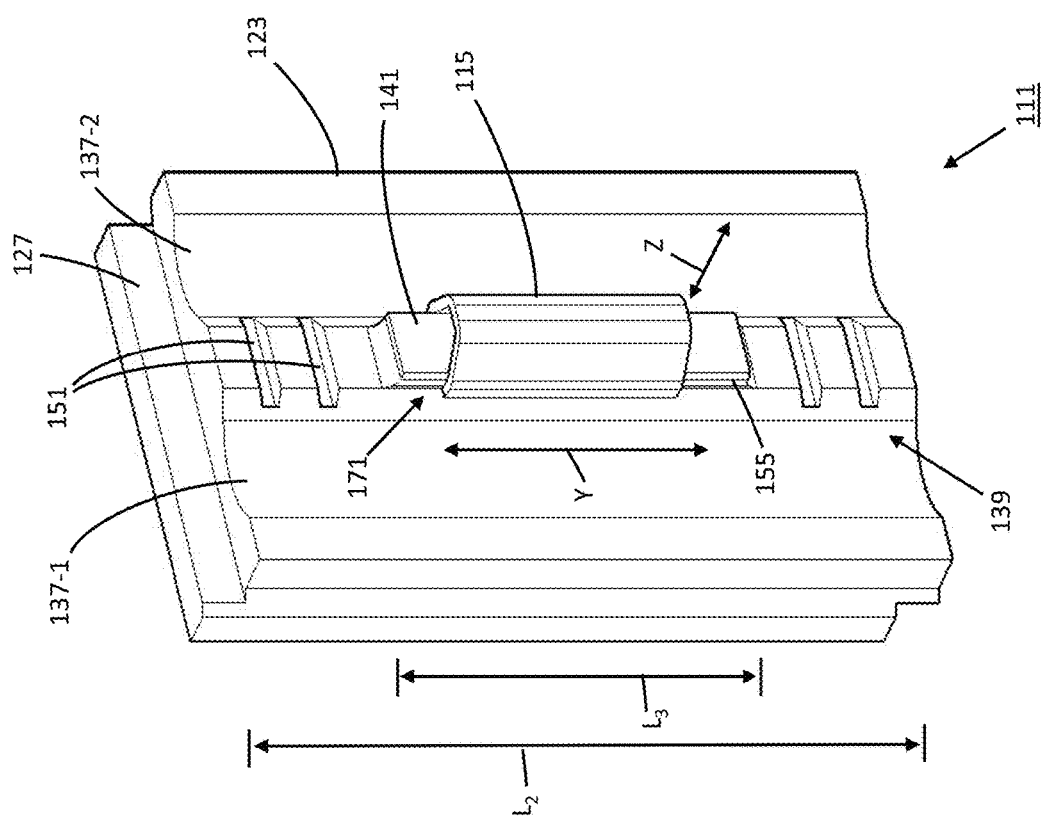

Base 123 is integrally formed onto rear surface 127 in both a downwardly and laterally offset relationship relative thereto. Referring now to FIGS. 2(a), 3(a), and 3(b), base 123 is a generally block-shaped member with an exposed rear surface 135 that is shaped to define a pair of semi-cylindrical cavities 137-1 and 137-2 which are separated by a center longitudinal rail 139.

Each semi-cylindrical cavity 137 extends vertically along the length of base 123 and is dimensioned in size, shape, and radial curvature to match the contour of a single tube in a waterwall panel. In this manner, heat captured by tile 113 is uniformly dispersed onto the tube of a waterwall panel and, in turn, to the water retained therein.

Center rail 139 comprises a longitudinal rib 140 which extends the length of base 123, rib 140 having a length $L_2$ of approximately 12 inches. Additionally, center rail 139 comprises a dovetail pin, or protrusion, 141 that projects outwardly from rib 140. Pin 141 has a length $L_3$ of approximately 6 inches and is located at the approximate midpoint of longitudinal rib 140, thereby creating externally exposed portions 143-1 and 143-2 of rib 140 on opposing sides thereof. As will be explained further in detail below, limiting the length of pin 141 greatly simplifies the process of installing a plurality of adjacent tile assemblies 111 onto a common waterwall panel.

Each exposed portion 143 of rib 140 is provided with a pair of spaced apart, lateral grooves, or cleats, 151. Each groove 151 is generally U-shaped in transverse cross-section. In use, once tile assembly 111 has been installed onto a waterwall panel, a mortar-like bonding material is preferably deposited between tile assembly 111 and the waterwall panel. Due to the presence of grooves 151, the bonding material effectively adheres to tile 113 through grooves 151. Accordingly, the bonding material serves to provide an effective means for connecting tile 113 to a waterwall panel other than solely through the use of metal connective anchor 115, which is highly desirable since metal anchor 115 may be subject to corrosive effects.

Dovetail pin 141 serves as tile component on which metallic anchor 115 is mounted. As seen most clearly in FIGS. 4(a) and 4(b), pin 141 includes a pair of opposing sidewalls 155, with each sidewall 155 configured with an inwardly beveled cut. Specifically, each sidewall 155 includes an inner portion 157 that flairs slightly outward in the rearward direction and a contiguous outer portion 159 that cuts slightly inward in the rearward direction. As will be explained further below, the beveled cut of sidewalls 155 is used to create a dovetail joint between pin 141 and anchor 115 that ensures a strong and durable connection without the need of cavities and bolt-type fastening elements, which have been found to breakdown and fail over time.

As seen in FIGS. 3(a) and 3(b), the thickness of base 123 is greatest along longitudinal rib 140. As a result, the lowest amount of thermal radiation that emanates from base 123 is through center rail 139. Because the primary connective elements for tile assembly 111 (namely, metal anchor 115 and grooves 151) are located along center rail 139, increasing the thickness of base 123 through longitudinal rib 140 serves to protect metallic anchor 115 and any mortar located within grooves 151 from extreme heat, thereby minimizing the risk of mechanical failure over time.

Figure 5A:
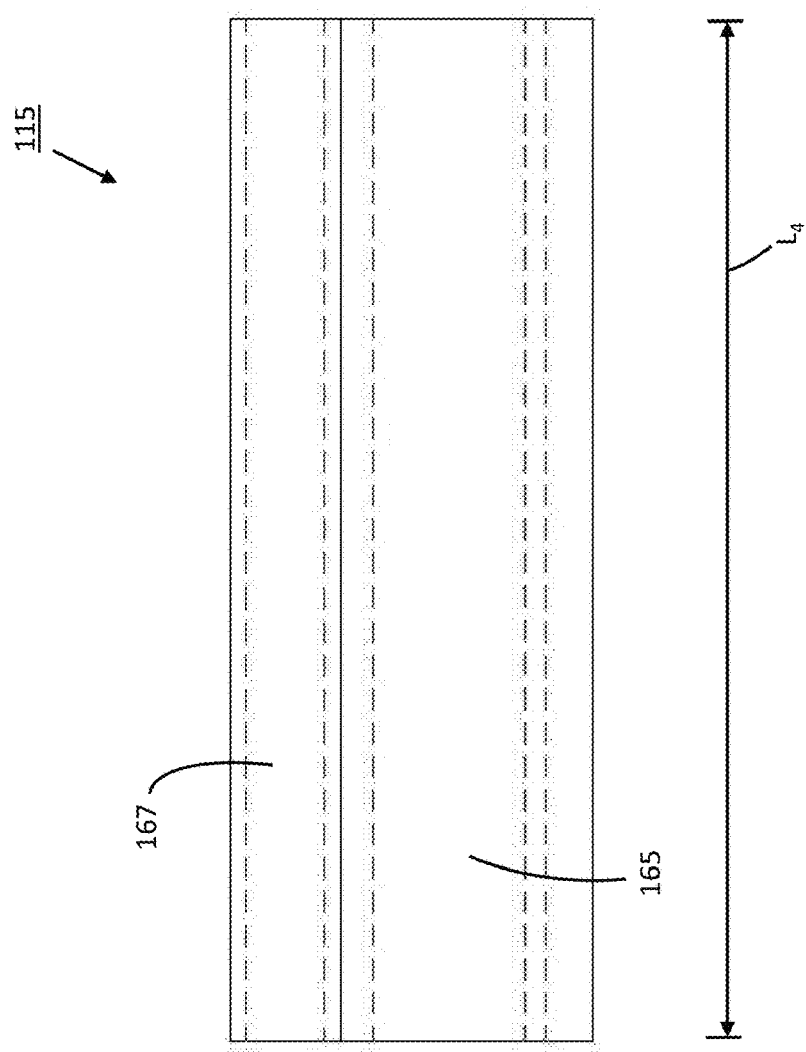
FIGS. 5(a) and 5(b) are enlarged, top and a right-side views, respectively, of the metallic anchor shown in FIG. 2(a)
Figure 5B:
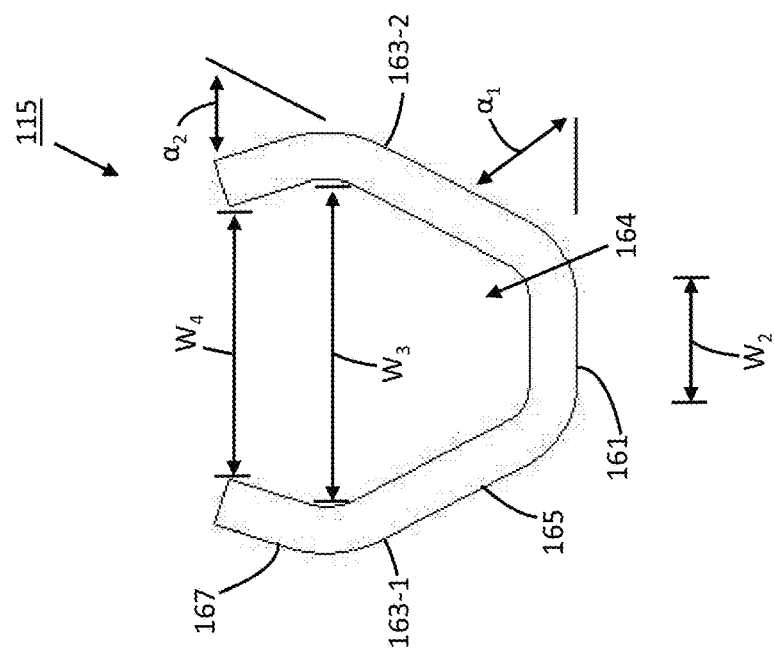

Referring now to FIGS. 5(a) and 5(b), anchor 115 is preferably formed as a unitary, elongated clip that is constructed of a rigid and durable metal material, such as stainless steel, carbon steel or other similar metal, which preferably matches the material of the waterwall panel on which tile assembly 111 is to be mounted. Anchor 115 comprises a horizontal center member, or top, 161 from which downwardly protrudes a pair of opposing side members, or fingers, 163-1 and 163-2. Together, top 161 and fingers 163 define an interior longitudinal channel 164, which is generally U-shaped in transverse cross-section along its length.

As can be seen, each of fingers 163 is configured with an inwardly beveled cut. Specifically, each finger 163 includes an inner segment 165 that flairs slightly outward at an angle $\alpha_1$ of approximately 62.4 degrees relative to top 161 and a contiguous outer segment 167 that cuts slightly inward from inner segment 165 at an angle $\alpha_2$ of approximately 45.1 degrees.

Dimensionally, anchor 115 has an overall length $L_4$ of approximately 4.0 inches, which suitable in length to provide an adequate retentive force. At the same time, length $L_4$ is limited in relation to center rail 139 to provide adequate clearance when installing multiple adjacent tile assemblies 111 onto a common waterwall panel.

As referenced above, fingers 163 have an inwardly beveled cut which is used to create a dovetail joint with pin 141. As a result, channel 164 has a reduced width $W_2$ of approximately 0.5 inches along top 161, flairs considerably outward to a maximum width $W_3$ of approximately 1.25 inches at the junction between segments 165 and 167, and then narrows inward to an intermediate width $W_4$ of approximately 1.0625 inches at the distal end of fingers 163. As seen in FIGS. 4(a) and 4(b), the maximum width $W_3$ and intermediate width $W_4$ of channel 164 are designed to match the dimensions of pin sidewalls 155, thereby creating a secure dovetail joint.

It is important to note that the body of metallic anchor 115 is solid and free of any slots, cavities, holes or other areas of weakness into which corrosive elements may collect. As can be appreciated, applicant has recognized that conventional means for attaching refractory tiles to waterwall panels that include unprotected areas of weakness in the refractory tile and/or fastening anchor are often the region in which mechanical failure ultimately occurs.

Referring back to FIG. 3(a), metallic anchor 115 and pin 141 together form a dovetail joint 171. Accordingly, dovetail joint 171 allows for longitudinal displacement of anchor 115 along pin 141, as represented by arrow Y. However, dovetail joint 171 prohibits any outward separation of anchor 115 from pin 141 in the direction as represented by arrow Z. As such, dovetail joint 171 serves as an effective means of ensuring secure and reliable coupling between anchor 115 and pin 141 that does not rely upon the use of traditional bolt-type anchoring fastening elements, which have been found to be prone to mechanical failure over time. Accordingly, the implementation of dovetail anchor 171 as the principal means of connecting tile 113 to a waterwall panel (e.g., prior art panel 11) serves as a principal novel feature of the present invention.

Process of Installing Multiple Tile Assemblies 111 onto a Waterwall Panel 11

Figure 6A:
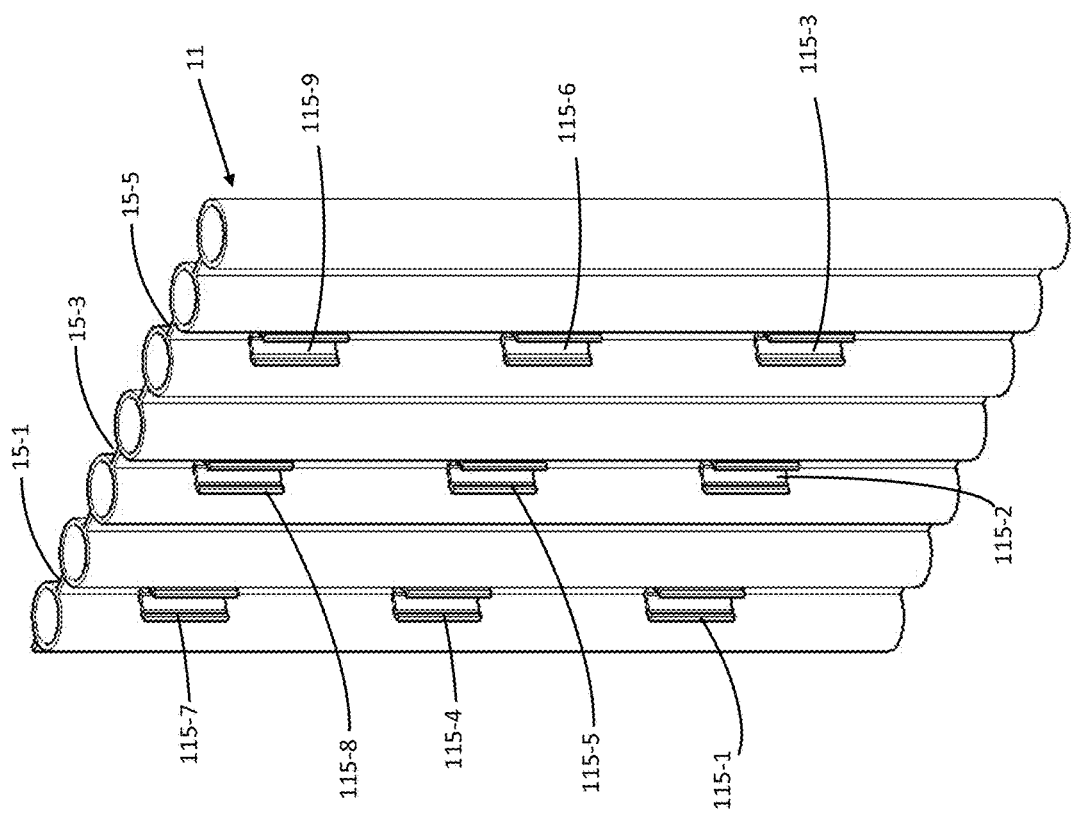
FIGS. 6(a)-(c) are a series of front perspective views of a preferred means of installation of a plurality of the tile assemblies shown in FIG. 2(a) onto a conventional waterwall panel to create a uniform refractory liner for a furnace.
Figure 6B:
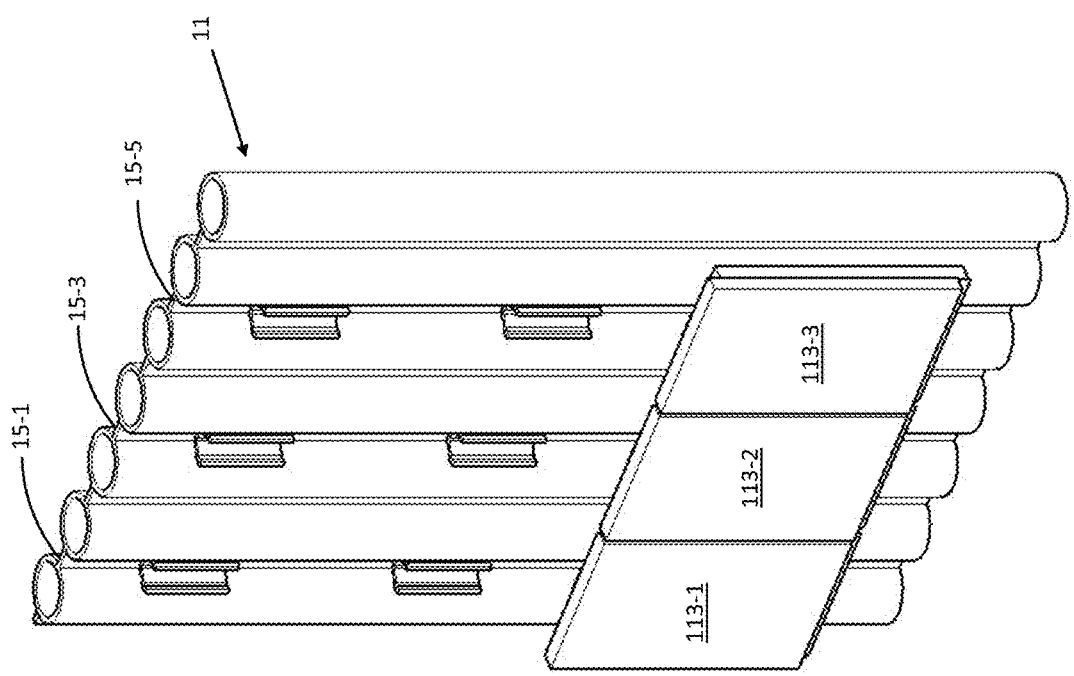
Figure 6C:
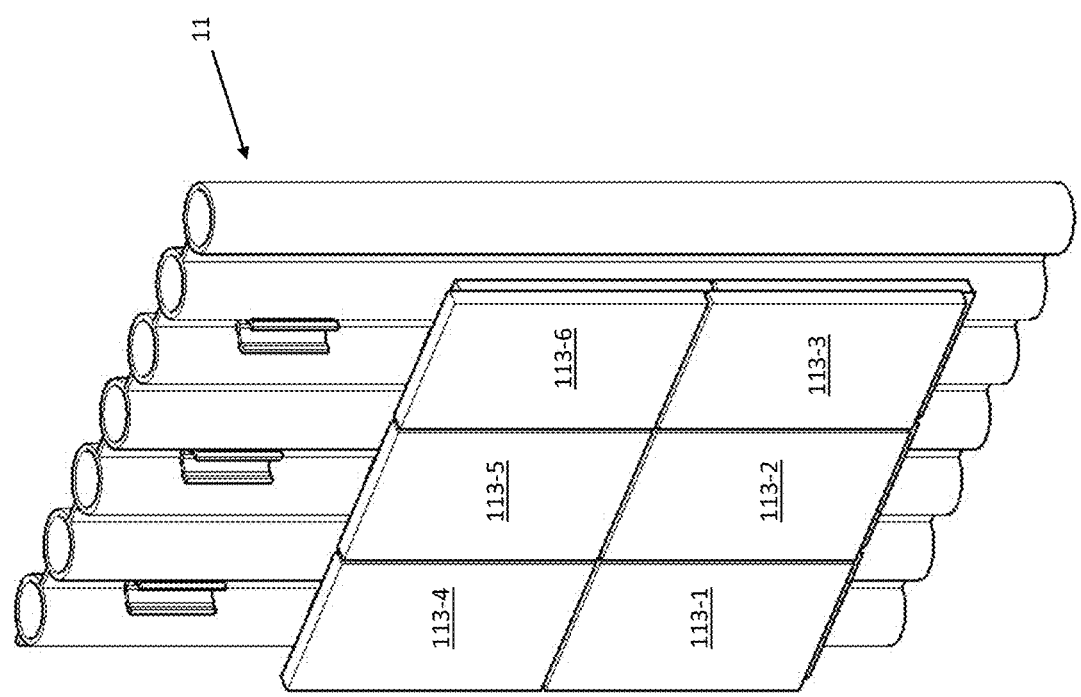

Referring now to FIGS. 6(a)-(c), there is shown a series of front perspective views which illustrate a preferred means of installing a plurality of tile assemblies 111 onto a conventional waterwall panel 11 to create a uniform refractor liner for a furnace or other similar incineration device. It should be noted that the installation process to be explained in detail below greatly simplifies and streamlines the refractory liner assembly process. However, it is to be understood that alternative techniques for installing tile assemblies 111 onto a common waterwall panel 11 could be implemented without departing from the spirit of the present invention.

As the first step of the installation process, a plurality of metallic anchors 115-1 thru 115-9 is permanently welded, or otherwise fixedly secured, to conventional waterwall panel 11 in the manner as set forth in FIG. 6(a). As seen most clearly in FIGS. 4(b) and 6(a), each anchor 115 is arranged and affixed to panel 11 with its top 161 disposed in direct contact against webbing 15, its fingers 163 disposed in direct contact against an adjacent pair of waterwall tubes 13, and the distal ends of its fingers 163 exposed for releasable coupling to dovetail pin 141.

Due to the dimensions of refractory tile 113 in relation to waterwall panel 11, anchors 115 are preferably arranged as horizontal rows on alternating webbings 15-1, 15-3, and 15-5. Further, anchors 115 are preferably spaced as vertical columns with a separation distance of approximately 8.0 inches therebetween. In this manner, anchors 115 are fixedly secured to waterwall panel 11 in a grid-like arrangement.

As seen in FIG. 6(b), a first set of refractory tiles 113-1 thru 113-3 is mounted onto anchors 115-1 thru 115-3, respectively. Each tile 113 is preferably installed by aligning its pin 141 directly above a corresponding anchor 115. Thereafter, each tile 113 is displaced vertically downward such that pin 141 fittingly projects into the longitudinal channel 164 defined by its anchor 115, thereby creating a dovetail locking joint which precludes orthogonal separation of tile 113 from anchor 115. The ability to secure each tile 113 to a corresponding pin 141 by simply sliding tile 113 vertically down into engagement with pin 141 ensures that no direct stress is imparted onto the resultant dovetail joint, which is highly beneficial for connective longevity.

As seen in FIG. 6(c), a second set of refractory tiles 113-4 thru 113-6 is mounted onto anchors 115-4 thru 115-6, respectively. Subsequent sets of refractory tiles 113 are thereafter installed left-to-right along the bottommost row of available anchors 115. Additional rows of tiles 113 can then be installed directly above mounted rows of tiles 113 until the desired refractory liner wall is constructed.

Due to the offset relationship between planar slab 121 and mounting block 123 for each refractory tile 113, the installation of tiles 113, left-to-right, into horizontal rows which are then, in turn, arranged vertically, bottom-to-top, provides the necessary clearance to produce a uniform, planar, refractory liner surface, which is highly desirable. Furthermore, because length $L_4$ of clip 115 is substantially less than the overall length $L_2$ of tile 113, the entire array of clips 115 can be welded onto waterwall panel 11 as a single process without interfering with the connection of each tile 113 onto its associated anchor 115 (i.e., due to the inherent measurement tolerances directly incorporated into the design of tile assembly 111).

Upon completion of the installation of the entire array of refractory tiles 113 on waterwall panel 11, a supply of bonding material (e.g., a curable mortar) is deposited between rear surface 135 of each tile 113 and waterwall panel 11. Upon curing, the bonding material not only locks the position of each tile 113 on anchor 115 11 but also serves as an additional means of coupling refractory tile 113 to waterwall panel 11. Specifically, because cleats 151 in tile 113 provide a surface with which the bonding material can engage, direct connection between tile 113 and panel 11 can be achieved other than solely through anchor 115. As a result, less mechanical stress is directly imparted on anchor 115, therefore rendering anchor 115 less susceptible to mechanical failure over time.

It should be noted that the particular number and arrangement of anchors 115 and tiles 113 are preferably selected based on the dimensional requirements of the refractory liner for the intended application. Accordingly, the particular arrangement of anchors 115 and tiles 113 shown in FIGS. 6(a)-(c) is provided for illustrative purposes only and modifications could be readily implemented without departing from the spirit of the present invention.

Features and Advantages of Tile Assembly 111

Tile assembly 111 is constructed with a number of unique design features which provide distinct advantages over conventional refractory tiles used to create a refractory liner (e.g., in an EfW facility).

As a first feature, tile assembly 111 disposes the entirety of metallic anchor 115 behind refractory tile 113. In fact, metallic anchor 115 is spaced significantly away from interior surface 125 of tile 113 by longitudinal rib 140. As a result, metallic anchor 115 is effectively protected by refractory tile 113 from extreme heat or other corrosive effects that may compromise its structural integrity and connective strength over time.

As a second feature, tile assembly 111 utilizes a dovetail joint to connect refractory tile 113 to a waterwall panel. As a result, refractory tile 113 can be manufactured without the need of a bore, slot, cavity, or other area of weakness therein that is necessary to receive a coupling fastener. Because cavities incorporated into conventional refractory tiles to receive coupling fasteners have been found to be susceptible to cracking and/or the accumulation of corrosive effects, the ability of tile assembly 111 to be secured to a waterwall panel without the use of any fastener receiving cavities in tile 113 minimizes this risk of material degradation and fastener breakdown. Consequently, tile assembly 111 is provided with a more durable and reliable means of connection than conventional refractory tiles, which have been found to be susceptible to mechanical failure after extensive exposure to extreme heat and corrosive effects.

As a third feature, the direct connection of metallic anchor 115 to a waterwall panel via top 161 as well as segments 165 serves, in part, to cool metallic anchor 115. Specifically, because the waterwall tubes of a waterwall panel are specifically designed to transfer extreme heat to the liquid retained therein, the waterwall tubes would effectively assist in cooling the metallic anchor 115 due to its direct contact and/or close proximity relative thereto. As can be appreciated, cooling metallic anchor 115 helps preserve its structural integrity and thereby minimizes the risk of corrosive attack and mechanical breakdown.

As a fourth feature, the incorporation of cleats 151 into tile 113 provides a supplemental means of connecting tile 113 to panel 11 (i.e., in addition to anchor 115). As noted previously, cleats 151 serve as a surface with which a bonding material can engage, thereby enabling the bonding agent to serve as an additional means of connection between tile 113 and panel 11. As a result, less mechanical stress is directly imparted onto anchor 115, therefore rendering anchor 115 less susceptible to mechanical failure.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A tile assembly adapted for connection to a waterwall panel, the tile assembly comprising:
    (a) a refractory tile having a length, the refractory tile comprising a planar front surface and a non-planar rear surface, the non-planar rear surface including a center longitudinal rail, the center longitudinal rail including a dovetail pin that projects out from a longitudinal rib that extends the length of the refractory tile, wherein at least one lateral groove is formed in the longitudinal rib, the dovetail pin having a length that is less than the length of the longitudinal rib, the dovetail pin including a pair of opposing sidewalls, each of the pair of opposing sidewalls having an inwardly beveled cut; and
    (b) a metallic anchor, the metallic anchor comprising a center member from which protrudes a pair of opposing side members, each of the pair of opposing side members comprising,
        (i) an inner segment that flairs outward from the center member, and
        (ii) an outer segment contiguous from the inner segment, the outer segment projecting inward in relation to the inner segment;
    (c) wherein the metallic anchor is mounted on the dovetail pin of the refractory tile, the metallic anchor and the dovetail pin together forming a dovetail joint.

2. The tile assembly as claimed in claim 1 wherein the non-planar rear surface of the refractory tile is shaped to define a pair of semi-cylindrical cavities that is separated by the center longitudinal rail.

3. The tile assembly as claimed in claim 1 wherein the refractory tile comprises:
    (a) a rectangular planar slab having a flat front surface and a flat rear surface; and
    (b) a mounting block integrally formed onto the flat rear surface of the rectangular planar slab.

4. The tile assembly as claimed in claim 3 wherein the mounting block is integrally formed onto the rear surface of the rectangular planar slab in an offset relationship relative thereto.

5. The tile assembly as claimed in claim 3 wherein the mounting block has a variable thickness, the thickness of the mounting block being greatest through the center longitudinal rail.

6. The tile assembly as claimed in claim 1 wherein the center member and the pair of opposing side members together define an interior longitudinal channel that is generally U-shaped in transverse cross-section.

7. The tile assembly as claimed in claim 6 wherein the interior longitudinal channel of the metallic anchor is dimensioned to receive the dovetail pin.

\* \* \* \* \*